United States Patent [19]

Kasai et al.

[11] Patent Number: 4,664,275
[45] Date of Patent: May 12, 1987

[54] MEDICAL CONTAINER STOPPER

[75] Inventors: Masaaki Kasai, Fuji; Kenji Ishikawa, Fujinomiya, both of Japan

[73] Assignee: Terumo Kabushiki Kaisha, Tokyo, Japan

[21] Appl. No.: 772,671

[22] Filed: Sep. 5, 1985

[30] Foreign Application Priority Data

Sep. 7, 1984 [JP] Japan .................................. 59-187806

[51] Int. Cl.$^4$ ............................................. B65D 39/00
[52] U.S. Cl. .................................................. 215/247
[58] Field of Search ........................ 215/247, 355, 364

[56] References Cited

U.S. PATENT DOCUMENTS 3,136,440 6/1964 Krug et al. ........................ 215/247
4,444,330 4/1984 Kasai et al. ....................... 215/247

Primary Examiner—Donald F. Norton
Attorney, Agent, or Firm—Burns, Doane, Swecker & Mathis

[57] ABSTRACT

A stopper for hermetically sealing an opening of a medical container. The stopper is made of a composition comprising 30 to 80% by weight of a partially cross-linked butyl rubber, 10 to 40% by weight of a thermoplastic resin, and 5 to 50% by weight of an inorganic powder.

10 Claims, 5 Drawing Figures

MEDICAL CONTAINER STOPPER

BACKGROUND OF THE INVENTION

1. Field of the Invention

The present invention relates to a medical container stopper and, more particularly, to a medical container stopper for hermetically sealing medical container, particularly a reduced pressure blood collection tube at its opening.

2. Description of the Prior Art

Hard medical containers such as so-called vacuum blood collection tubes or drug bottles are hermetically sealed at their openings in order to maintain internal reduced pressure or to shield the contents from the external atmosphere. For this purpose, a vulcanized butyl rubber stopper is conventionally used. This type of stopper can provide a good hermetic seal. However, as pointed out in Japanese Patent Disclosure No. 58-58057, additives contained in the vulcanized butyl rubber such as sulfur or a vulcanization accelerator elute into blood or drugs. In order to resolve this problem, a stopper made of a polymeric substance other than vulcanized butyl rubber is disclosed in the Japanese Patent Disclosure No. 58-58057 mentioned above. A stopper disclosed in this Disclosure is made of a material comprising 30 to 80% by weight of a butyl rubber and 20 to 70% by weight of a thermoplastic elastomer. The stopper provides an excellent hermetic seal and is free from the problem encountered with vulcanized butyl rubber.

However, the stopper disclosed in Japanese Patent Disclosure No. 58-58057 still poses problems with respect to compression set and gas barrier performance (gas impermeability).

SUMMARY OF THE INVENTION

It is, therefore, an object of the present invention to provide a medical container stopper which is free from the problems of conventional stoppers, which has excellent compression set property, gas barrier performance, and hermetic seal, and does not cause elution of additives.

The object of the present invention has been achieved by a stopper for hermetically sealing an opening of a medical container, which is made of a composition comprising 30 to 80% by weight of partially cross-linked butyl rubber, 10 to 405 by weight of a thermoplastic resin, and 5 to 50% by weight of an inorganic powder. The inorganic powder is preferably in the form of flakes or plates such as mica.

DETAILED DESCRIPTION OF THE PREFERRED EMBODIMENTS

Figure 1:
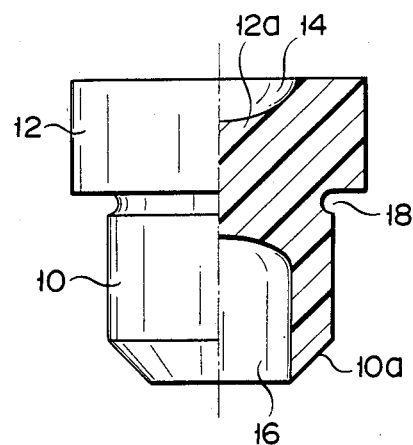
FIGS. 1 to 3 are partially sectional side views of medical container stoppers according to the present invention.

A composition forming a medical container stopper of the present invention contains 30 to 80% by weight of partially cross-linked butyl rubber, as described above. The partially cross-linked butyl rubber reduces the compression set of the stopper, provides good gas barrier performance to the stopper and decreases its hardness. When the amount of the partially cross-linked butyl rubber is less than 30% by weight, the compression set is not satisfactorily reduced, and good gas barrier performance is not obtained. However, when the amount of the partially cross-linked butyl rubber exceeds 80% by weight, flowability of the resultant stopper material is reduced and molding performance is impaired. This is because partially cross-linked butyl rubber has poor flowability and cannot be properly molded without addition of other components.

From the viewpoint of obtaining a low compression set, the partially cross-linked butyl rubber preferably has a cyclohexane soluble content (by extraction in cyclohexane of 100 times weight by a Soxhlet extractor for 5 hours) of 60% or less. Examples of such partially cross-linked butyl rubber may include "XL-20" (cyclohexane soluble content: 18%) available from Polyser Corp., "Escorant-10" (cyclohexane soluble content: 50%) available from Exxon Chemical Corp., and "Kaylor 5236" (cyclohexane soluble content: 12%) available from Hardman Corp. These partially cross-linked butyl rubbers are not partially cross-linked by a sulfur cross-linking agent but by, for example, divinyl benzene.

In order to impart good flowability and moldability to the stopper material, the composition of the present invention contains 10 to 40% by weight of a thermoplastic resin. When the amount of the thermoplastic resin is less than 10% by weight, a predetermined flowability to provide good moldability cannot be obtained. On the other hand, when the amount of the thermoplastic resin exceeds 40% by weight, hardness of the composition is excessively increased when thermoplastic resins having good gas barrier performance such as nylon or polyethylene terephthalate are used, and conversely, gas barrier performance is impaired when resins having low hardness such as polyethylene or an ethylene-vinyl acetate copolymer are used. When a selected thermoplastic resin has a melt index (MI) of 10 g/10 min (230° C., 2.16 kg) or more, still better flowability of the resultant composition is obtained. Examples of such thermoplastic resins may include polyethylene "MV-30" (MI: 45 g/10 min) or "YK-30" (MI: 5 g/10 min) available from Mitsubishi Petrochemical Co., Ltd., polypropylene "JHH-G" (MI: 5 g/10 min) available from Mitsui Toatsu Chemicals Inc., and an ethylene-vinyl acetate copolymer "x301" (MI: 10 g/10 min) available from Mitsubishi Petrochemical Co., Ltd. The other examples are an ethylene-propylene copolymer, a styrene-butadiene copolymer, a styrene-isoprene copolymer and a hydrogenated styrene-butadiene copolymer.

In order to impart a still more improved gas barrier performance to the stopper of the present invention, the stopper material further contains 5 to 50% by weight of an inorganic powder. The inorganic powder itself is not permeable to gases and substantially elongates and narrows good permeation paths so as to reduce gas permeation through the stopper. When the amount of the inorganic powder is less than 5% by weight, the effect of adding such an inorganic powder is not obtained. However, if the amount of the inorganic powder exceeds 50% by weight, hardness of the resultant stopper material is excessively increased.

The inorganic powder preferably has an average particle size of 40 μm or more but less than 150 μm. It is particularly preferable that the inorganic powder have a flake-like or platy shape as in the case of mica so as to elongate gas permeation paths and to improve gas barrier performance. Examples of such mica may include "K-200" (average particle size: 50 μm) and "K-300" (average particle size: 38 μm) available from Repco Corp. and "Suzolite Mica 200-S" (average particle size: 62 μm) available from KURARAY CO., LTD.

The stopper material according to the present invention has the composition described above. However, the composition can further contain additives such as an agent for improving flowability, e.g., liquid paraffin, a mold-releasing agent for imparting a good releasing property, a stabilizer, a pigment, a filler (e.g., talc) and the like. These additives can be added based on the total weight of the butyl rubber and the thermoplastic resin in amounts of 20 phr or less for liquid paraffin, 10 phr or less for the mold-releasing agent, 5 phr or less for the stabilizer, 15 phr or less for the pigment, and 120 phr or less for the filler.

Figure 2:
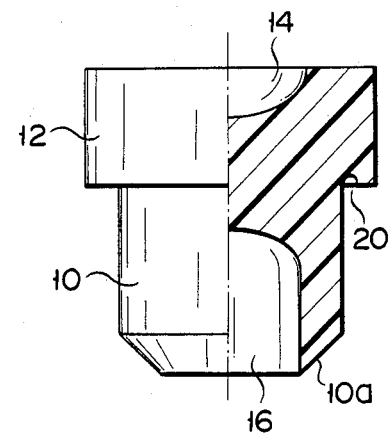
Figure 3:
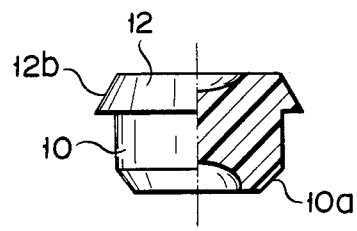

In order to mold a stopper for a medical container from the stopper material described above, the respective components are milled into a sheet after mixing by a Banbury mixer at 130° to 180° C. and is pelletized thereafter. The resultant pellets are injection molded at 180° to 220° C. A stopper molded in this manner has a columnar body 10 with a tapered distal end face 10a, and a head 12 with a diameter larger than that of the body 10, as shown in FIG. 1. Recesses 14 and 16 are formed in the top surface of the head 12 and the bottom surface of the body 10 so as to extend toward each other. The recesses 14 and 16 thus define a thin portion 12a for allowing easy piercing by a blood collection cannula. An annular groove 18 is formed in a portion of the body 10 near the head 12. When the stopper is forced into the container, the annular groove 18 prevents the stopper from slipping from the container due to internal pressure therein. A stopper shown in FIG. 2 has the same structure as that shown in FIG. 1 except that the stopper shown in FIG. 2 has an annular groove 20 in a lower surface of a portion of a head 12 projecting from a body 10. The same reference numerals as in FIG. 1 denote the same parts in FIG. 2. The annular groove 20 prevents the stopper from dropping inside the container. A stopper shown in FIG. 3 is a so-called vial stopper and has the same structure except that the overall stopper shown in FIG. 3 has a flatter shape than that shown in FIG. 1 and a head 12 has an inverted tapered outer surface 12b.

Figure 4:
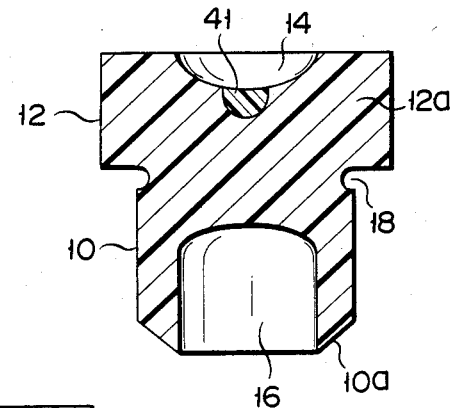
FIG. 4 is a sectional view of another medical container stopper according to the present invention.

FIG. 4 shows a stopper of a type which can provide a seal without forming a gap between a blood collection cannula and the stopper when the cannula pierces the stopper. The stopper shown in FIG. 4 is different from that shown in FIG. 1 in that a sealing member 41 is embedded in the bottom center (which is pierced by a cannula) of a recess 14. The sealing member 41 is obtained by insert molding performed by injection molding after injection molding of the stopper main body. The sealing member 41 can consist of a styrene-based elastomer, e.g., "TR2104" or "G7705" (hardness: 55 or less according to JISA) available from Shell Chemical Co. or "Lavaron 342C" available from Mitsubishi Petrochemical Co., Ltd. This series of molding operations can be performed efficiently by a two-color molding machine. Alternatively, such a stopper can be obtained by molding a stopper having a recess at the bottom center of a recess 14, flowing a liquid rubber such as a silicone sealant in the recess, and curing the rubber.

Figure 5:
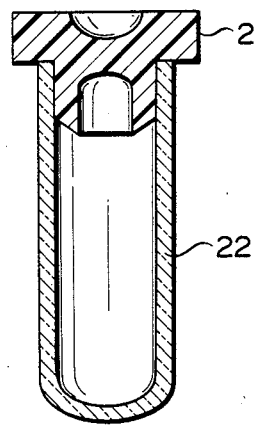
FIG. 5 is a sectional view of a reduced pressure blood collection tube using a stopper of the present invention.

A stopper according to the present invention can be conveniently used in a vacuum blood collection tube as shown in FIG. 5. Referring to FIG. 5, a blood collection tube 22, the interior pressure of which is reduced to allow drawing of a predetermined amount of blood, is hermetically sealed with a stopper 21 as shown in FIG. 1 and the reduced internal pressure is maintained.

A test example for testing the properties of the stopper material according to the present invention will be described below.

TEST EXAMPLE

The components shown in Table 1 were mixed by a Banbury mixer at 150° C. for 10 minutes to provide a molding material. The test results are shown in Table 1. The moldability of the material of Example 3 was better than that of the materials of Examples 1, 2, 4 and 5.

TABLE 1

| Component | | Example | | | | | | | Comparative Example (Unit: % by weight) |
|---|---|---|---|---|---|---|---|---|---|
| Type | Trade Name (Company) | 1 | 2 | 3 | 4 | 5 | 6 | 7 | 1 |
| Partially Cross-linked Butyl Rubber | "XL-20" (Polyser Corp.) | 50 | | 50 | 50 | 50 | 35 | 40 | 27 |
| Partially Cross-linked Butyl Rubber | "Escorant-10" (Exxon Chemical Corp.) | | 50 | | | | | | |
| Polyisobutylene | "Vistanex MML-100" (Exxon Chemical Corp.) | | | | | | | | 32 |
| 1,2-Polybutadiene | "RB-830" (Nihon Gosei Gomu K.K.) | | | | | | | | 23 |
| Polyethylene | "MV-30" (Mitsubishi Petrochemical Co., Ltd.) | 15 | 15 | | 15 | 25 | 5 | 15 | |
| Polyethylene | "YK-30" (Mitsubishi Petrochemical Co., Ltd.) | | | 15 | | | | | |
| Styrene-based Elastomer | "G-1652" (Shell Chemical Co.) | | | | | | | 8 | 9 |
| Mica | "K-200" (Repco Corp.) | 20 | 20 | 20 | | 20 | 50 | 45 | |
| Mica | "K-300" (Repco Corp.) | | | | 20 | | | | |

TABLE 1-continued (Unit: % by weight)

| Type | Component Trade Name (Company) | Example 1 | 2 | 3 | 4 | 5 | 6 | 7 | Comparative Example 1 |
|---|---|---|---|---|---|---|---|---|---|
| Talc | "JA-80R" (Asada Seifun K.K.) | 10 | 10 | 10 | 10 | | | | |
| Liquid Paraffin | Pharmacopeia (Wako Junyaku K.K.) | 5 | 5 | 5 | 5 | 5 | 2 | | 9 |

TABLE 2

| Properties | Example 1 | 2 | 3 | 4 | 5 | 6 | 7 | Comparative Example 1 | 2* |
|---|---|---|---|---|---|---|---|---|---|
| Rubber Hardness (JISA) | 74 | 76 | 73 | 74 | 79 | 85 | 83 | 67 | 63 |
| Compression Set (40° C. × 22 hr) | 51 | 65 | 50 | 51 | 60 | 68 | 65 | 73 | 70 |
| Oxygen Gas Permeation Coefficient at 30° C. (ml · cm/cm$^2$ · sec · cmHg) | $1.1 \times 10^{-10}$ | $1.1 \times 10^{-10}$ | $1.1 \times 10^{-10}$ | $1.8 \times 10^{-10}$ | $0.8 \times 10^{-10}$ | $0.6 \times 10^{-10}$ | $0.6 \times 10^{-10}$ | $4.3 \times 10^{-10}$ | $3.4 \times 10^{-10}$ |

*Materials described in Japanese Patent Disclosure No. 58-58057 (60% by weight of polyisobutylene ("MML-100" available from Exxon Chemical Corp.), 20% by weight of polyester elastomer ("Pelprene P-150M" available from TOYOBO CO. LTD.), and 20% by weight of an ethylene-ethyl acrylate copolymer ("DPOJ-9169" available from Nihon Bulker K.K.)

Stoppers for medical containers according to the present invention, as described above, have rubber-like elasticity and can provide an excellent hermetic seal over an extended period of time. The stoppers also provide an excellent seal (seal of a piercing hole) after being pierced by a cannula. The stoppers of the present invention do not contain additives which elute: they provide safety and allow correct analysis of contents of containers as compared to conventional stoppers. Since the stoppers of the present invention contains an inorganic powder, it has an excellent gas barrier performance and does not cause deterioration of the contents of containers. When a stopper of the present invention is used for a vacuum blood collection tube, it can maintain a reduced internal pressure for a longer period of time than can a conventional stopper. The stopper of the present invention has a small compression set, does not cause improper fitting between the stopper and a hard medical container such as a glass tube, and can withstand temperature change.

Since a stopper of the present invention consists of a material which can be injection molded, it exhibits the same properties before and after injection molding unlike conventional vulcanized rubber which exhibits plasticity before molding and elasticity after molding. For this reason, a stopper of desired properties can be easily manufacured by properly selecting raw materials. Furthermore, since the stopper material of the present invention is not vulcanized, a runner and sprue can be recovered and reused for injection molding again without incineration. The stopper material can be injection molding and the molding time is significantly reduced as compared to a conventional process involving a vulcanization step, and mold releasing property is excellent, thereby facilitating mass-production of stoppers.

A stopper of the present invention has an excellent heat resistance, and withstands temperature changes during storage and transportation and γ-ray sterilization. Since the stopper material of the present invention is not vulcanized, it does not generate sulfur dioxide upon incineration. The stopper material of the present invention does not contain metals such as lead and is therefore free from the problem of metal elution.

The stopper with the sealing member of the present invention can particularly prevent formation of a gap between the stopper and a cannula when the cannula pierces the stopper, and can prevent spilling and contamination of the stopper by blood.

What is claimed is:

1. A stopper for hermetically sealing an opening of a medical container, formed of a composition comprising:
   30 to 80% by weight of a partially cross-linked butyl rubber;
   10 to 40% by weight of a thermoplastic resin; and
   plate-like
   5 to 50% by weight of an inorganic powder.

2. A stopper according to claim 1, wherein the inorganic powder has an average particle size of 40 to 150 μm.

3. A stopper according to claim 1, wherein the inorganic powder comprises mica.

4. A stopper according to claim 1, wherein the partially cross-linked butyl rubber contains not more than 60% by weight of a cyclohexane soluble component.

5. A stopper according to claim 1, wherein the thermoplastic resin has a melt index of not less than 10 g/10 min.

6. A stopper according to claim 5, wherein the thermoplastic resin is a member selected from the group consisting of polyethylene, polypropylene, an ethylene-vinyl acetate copolymer, an ethylene-propylene copolymer, a styrene-butadiene copolymer, a styrene-isoprene copolymer and hydrogenated derivatives thereof.

7. A stopper according to claim 1, wherein the stopper has a thin portion through which a cannula can pierce.

8. A stopper according to claim 7, wherein a sealing member is formed in the thin portion, the sealing member preventing formation of a gap between the stopper and the cannula when the stopper is pierced by the cannula.

9. A stopper according to claim 8, wherein the sealing member consists of a styrene-based elastomer.

10. A stopper according to claim 8, wherein the sealing member consists of a cured liquid rubber.

* * * * *

UNITED STATES PATENT AND TRADEMARK OFFICE
CERTIFICATE OF CORRECTION

PATENT NO. : 4,664,275

DATED : May 12, 1987

INVENTOR(S) : Kasai et al

It is certified that error appears in the above-identified patent and that said Letters Patent is hereby corrected as shown below:

In column 1, line 48, amend "405" to --40%--.

In column 2, line 59, amend "good" to --gas--.

Signed and Sealed this

Eighth Day of March, 1988

Attest:

DONALD J. QUIGG

Attesting Officer

Commissioner of Patents and Trademarks